United States Patent
Höllerer

(10) Patent No.: US 9,315,165 B2
(45) Date of Patent: Apr. 19, 2016

(54) VEHICLE INTERIOR DEVICE

(71) Applicant: RECARO Aircraft Seating GmbH & Co. KG, Schwäbisch Hall (DE)

(72) Inventor: Markus Höllerer, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 593 days.

(21) Appl. No.: 13/719,310

(22) Filed: Dec. 19, 2012

(65) Prior Publication Data

US 2013/0162022 A1   Jun. 27, 2013

(30) Foreign Application Priority Data

Dec. 27, 2011   (DE) .......................... 10 2011 122 188

(51) Int. Cl.
*B60R 16/03* (2006.01)
*B64D 11/06* (2006.01)
*B60N 2/02* (2006.01)
*B60N 2/44* (2006.01)

(52) U.S. Cl.
CPC ............ *B60R 16/03* (2013.01); *B64D 11/0624* (2014.12); *B64D 11/0638* (2014.12); *B60N 2002/0264* (2013.01); *B60N 2002/4405* (2013.01)

(58) Field of Classification Search
CPC ............... B60R 16/03; B64D 11/0624; B64D 11/0638; B60N 2002/4405
USPC ......................................................... 307/9.1
See application file for complete search history.

(56) References Cited

U.S. PATENT DOCUMENTS

| 6,749,257 | B2 | 6/2004 | Müller | |
| 8,388,056 | B2 * | 3/2013 | Smith | A47C 4/286 297/16.2 |
| 2002/0149237 | A1 * | 10/2002 | Muller | B60N 2/48 297/61 |
| 2005/0242635 | A1 * | 11/2005 | Cassaday | A47C 1/022 297/217.3 |
| 2006/0263921 | A1 * | 11/2006 | Nakamura et al. | 438/34 |
| 2010/0032999 | A1 | 2/2010 | Petitpierre | |
| 2011/0193372 | A1 | 8/2011 | Pizzuto | |
| 2013/0020845 | A1 * | 1/2013 | Boomgarden et al. | 297/217.3 |
| 2013/0093220 | A1 * | 4/2013 | Pajic | 297/163 |

FOREIGN PATENT DOCUMENTS

| DE | 10 063 406 A1 | 5/2002 |
| DE | 102005038972 B3 | 8/2006 |
| DE | 102008007586 A1 | 8/2009 |
| WO | 2004/017798 A1 | 3/2004 |

(Continued)

OTHER PUBLICATIONS

German Search Report issued from the German Patent Office dated Oct. 29, 2012 for the corresponding DE patent application No. 10 2011 12 188.7 (with English translation).

(Continued)

*Primary Examiner* — Scott Bauer
(74) *Attorney, Agent, or Firm* — Posz Law Group, PLC

(57) ABSTRACT

A vehicle interior device, in particular to an aircraft interior device, includes at least one power supply interface and at least one power supply unit.
The power supply unit is implemented by an energy harvesting unit.

8 Claims, 2 Drawing Sheets

(56) References Cited

FOREIGN PATENT DOCUMENTS

| WO | 2009/062974 A1 | 5/2009 |
| WO | 2013/045501 A1 | 4/2013 |

OTHER PUBLICATIONS

Extended European Search Report issued May 18, 2015 in the corresponding European patent application No. 12197794.6.

* cited by examiner

VEHICLE INTERIOR DEVICE

CROSS REFERENCE TO RELATED APPLICATION

This application is based on and incorporates herein by reference German Patent Application No. 10 2011 122 188.7 filed on Dec. 27, 2011.

BACKGROUND

The invention relates to a vehicle interior device, and in particular an aircraft interior device.

It is already known in the case of transporting persons in vehicles to provide passengers with a facility for supplying power to enable said passengers to operate personal electronic devices, such as laptops. For this purpose, a socket is usually provided in an internal compartment, into which socket the passenger can insert a power cable of the personal electronic device, and said socket is supplied with power from a power network on-board the vehicle.

SUMMARY

The invention is based on a vehicle interior device, in particular on an aircraft interior device having at least one power supply interface and a power supply unit. The term "vehicle interior device" is understood to mean in particular a device that is integrated in a vehicle internal compartment, for example in an aircraft cabin. In particular, the vehicle interior device is integrated in a vehicle seat, in a cabin side wall, in a cabin floor and/or in a cabin ceiling. The term "power supply interface" is understood to mean in particular an element that is provided for the purpose of transmitting power from one unit to a further unit and that comprises for this purpose preferably a receiving region for a power line means, for example a coaxial or USB cable, of a personal electronic device. The power line means of the personal electronic device can in so doing transmit electrical power that is received by way of the power supply interface directly to a power circuit of the personal electronic device or alternatively to a power converting unit of the personal electronic device, for example a power pack, in order to convert power parameters, for example voltage, current and/or alternating current frequency. The term "power supply unit" is understood to mean in particular a unit that provides electrical power in order to operate electronic units, in particular a personal electronic device. The power supply unit can be embodied, for example, as a power delivery unit that contains stored energy and can deliver said energy in the form of electrical power, for example a battery or a rechargeable battery, and/or as a power generating unit that generates electrical power, for example a power generator or a fuel cell, and/or as a power consuming unit that is powered by an operating network of a vehicle, said operating network being used to drive the vehicle.

It is proposed that the power supply unit is implemented by an energy harvesting unit. The term "energy harvesting unit" is understood to mean in particular a power generating unit that is provided for the purpose of receiving energy available in the environment of the energy harvesting unit and converting said energy into electrical power, for example a thermoelectric element that is based on the Seebeck effect and generates power from the ambient heat, a piezo element that can use vibrations that occur during the movement of the vehicle to generate power, and/or a power generating unit that comprises a solar cell. In particular, an energy source that is universally available can be used and consequently it is possible in particular to reduce power costs.

Moreover, it is proposed that the energy harvesting unit is implemented by a solar cell unit. The term "solar cell unit" is understood to mean in particular a unit that is provided for the purpose of generating electrical power by means of sunlight. The solar cell unit can be embodied, for example, as a solar cell made from mono- or poly-crystalline silicon, wherein the silicon can be doped with other chemical elements, such as boron or gallium, as an organic solar cell, as a thin-layer solar cell, as a Gratzel cell and/or any other solar cell that appears suitable to the person skilled in the art. In particular, a surface of the solar cell unit is embodied flush with a surrounding surface, however, it is fundamentally possible also for the surface of the solar cells to be elevated or recessed with respect to the surrounding surface. In particular, a universally available energy source can be used and consequently in particular power costs can be reduced. In a particularly advantageous manner, the vehicle interior device can be installed in a passenger aircraft, since sunlight is always available during the daytime when flying above cloud level.

In addition, a vehicle seat device is proposed into which the power supply unit is at least partially integrated. The term "vehicle seat device" is understood to mean in particular a device that is arranged at least partially in a vehicle seat, for example in a region of an arm rest, a back rest, a seat structure and/or a table. In particular, an advantageous positioning of the power supply unit can be achieved in a region in close proximity to the personal electronic device, as a consequence of which, in particular, a number of required power lines can be reduced.

In addition, it is proposed that the vehicle seat device forms at least a part of a table. The term "table" is understood to mean in particular a horizontally arranged surface that is arranged in a vehicle seat and that is provided for the purpose of providing a person sitting in a vehicle seat with a bearing surface on which objects can be placed, in particular a bearing surface on which meals can be placed, wherein the table can be arranged in the vehicle seat of the person or in a further vehicle seat. Preferably, the table is arranged in such a manner that it can be folded up by means of an articulated connection against a back-rest unit and/or in a back-rest unit of a vehicle seat and said table is provided for the purpose of being used by a person who is located in a vehicle seat immediately behind the vehicle seat in which the table is arranged. Alternatively, the table can be arranged in a further element of a vehicle interior, for example in a wall element. In particular, the bearing surface is provided for the purpose of placing thereon the personal electronic device. It can be achieved in particular in advantageously close proximity to the personal electronic device and power line elements can be reduced.

In addition, it is proposed that the power supply unit comprises at least one active surface having differing orientations and/or two active surfaces having differing orientations. The term "active surface" is understood to mean in particular a photovoltaic effective surface, by means of which an electric current is generated using light radiation of a particular wave length, preferably sunlight. The term "orientation" of an active surface is understood to mean in particular a direction of a normal vector of the active surface. The term "active surface having differing orientations" is understood to mean in particular that the active surface comprises at least two regions that mutually enclose an angle that deviates by at least 0.1°, advantageously at least 0.5° and preferably at least 1° from 0°. The term "two active surfaces having differing orientations" is understood to mean in particular that the active surfaces comprise in each case at least one orientation, wherein at least a pair of orientations of the two active surfaces comprise mutually differing orientations. Preferably, in the case of two active surfaces, individual active surfaces are arranged on different, preferably mutually opposite, sides of a unit that supports the active surfaces. In particular, a high current value can be obtained and a high level of safety and reliability of the power generation operation can be achieved.

In addition, an intermediate energy storage unit is proposed. The term "intermediate energy storage unit" is understood to mean in particular a unit that is embodied as an energy storage device and is provided for the purpose of being charged by the power supply unit in at least one condition, for example during a period where no personal electronic device is supplied with power by the power supply unit, and at least in a further condition of being discharged, wherein power is delivered to a further unit, preferably by way of the power supply interface to the personal electronic device. Consequently, it is possible in particular to use any unused energy and it is not necessary to provide additional power.

In addition, it is proposed that the power supply interface is implemented by a USB interface. The term "USB interface" is understood in particular to be an interface that is provided for the purpose of receiving a USB cable. In particular a widely-used, standardized power supply interface can be achieved that is to a great extent independent of a type of personal electronic device.

In addition, a power supply bearing unit is proposed on which the power supply unit is releasably mounted. The term "power supply bearing unit" is understood to mean in particular a unit that is provided for the purpose of providing a bearing surface and/or a receiving region for the power supply unit, on which and/or in which the power supply unit is releasably mounted at least in a condition that can be different from an operating condition of the power supply unit. The term "releasably mounted" is understood to mean in particular that it is held in a fixed position by means of at least one fastening means, wherein the fastening means can be released preferably without requiring a special tool and the power supply unit can be removed. Preferably, the power supply unit can be placed after removal for operation in a position selected by a user. For example, the power supply unit can be removed in order to create more space on a table in which the power supply unit is integrated. Consequently in particular a flexible positioning and an efficient power generating operation can be achieved.

In addition, a connecting unit is proposed that is provided in order to connect the power supply unit to at least one power supply unit at least of a further vehicle interior device. The term a "connecting unit" is understood to mean in particular a unit that comprises at least one power line element that is provided for the purpose of directing power from the power supply unit to at least one common power supply interface that supplies, for example, the personal electronic device with power, and/or to a common intermediate energy storage unit and/or direct to a further power supply unit. As an alternative or in addition thereto, the connecting unit can be used for the purpose of connecting the power supply unit and/or a plurality of power supply units to an operating network of the vehicle and for supplying excess power into said operating network, and/or in addition for receiving power from said operating network. In particular, a high current value can be obtained and a high level of safety and reliability of the power generating operation can be achieved.

BRIEF DESCRIPTION OF THE DRAWINGS

Further advantages are evident in the following description of the drawings. Three exemplary embodiments of the invention are illustrated in the drawings. The drawings, the description and the claims comprise numerous features in combination. The person skilled in the art will also regard the features individually in an expedient manner and combine them to form meaningful combinations.

DETAILED DESCRIPTION

Figure 1:
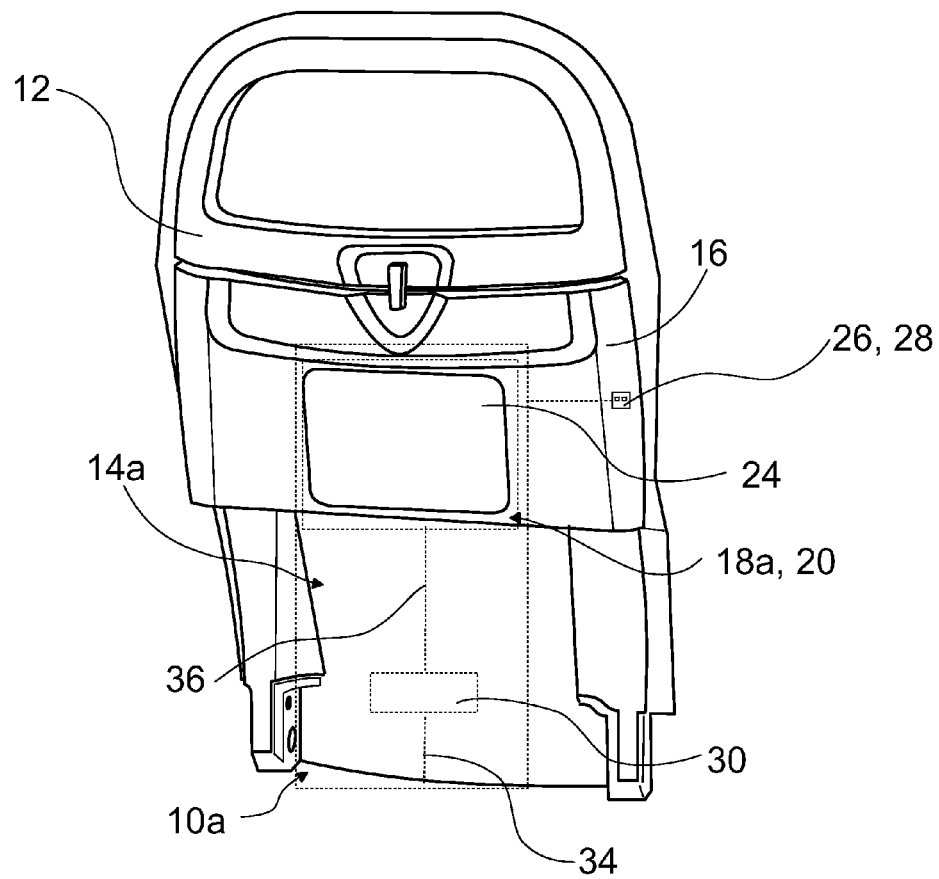
FIG. 1 is a schematic view of a vehicle seat having a vehicle interior device in accordance with the invention.

FIG. 1 illustrates a vehicle seat 12 that is embodied as an aircraft passenger seat having a vehicle interior device 10a that is in accordance with the invention and embodied as an aircraft interior device. The vehicle interior device 10a comprises a power supply interface that is implemented by a USB interface 28 and a power supply unit 18a that is implemented by an energy harvesting unit. The power supply unit 18a is used to supply power to a personal electronic device of a person being transported in a vehicle, in which the vehicle interior device 10a is installed. In order to supply power to the personal electronic device, a USB cable of the personal electronic device is inserted into the USB interface 28. The power supply unit 18a is integrated in a vehicle seat device 14a that forms a part of a table 16 that can be folded down. The table 16 is illustrated in a folded-up position. The power supply unit 18a is implemented by a solar cell unit 20 that comprises two active surfaces 22, 24 having differing orientations in the space. The differing orientations in the space are achieved by virtue of the fact that the solar cell unit 20 comprises on a front face and a rear face of the table 16 respectively one of the active surfaces 22, 24. Consequently, at least one of the active surfaces 22, 24 is available to generate power both in a folded-down state and also in the folded-up state of the table 16. As an alternative or in addition thereto, at least one of the active surfaces 22, 24 can also extend continuously in addition about at least one side region of the table 16, as a consequence of which the active surface 22, 24 comprises a plurality of orientations. The active surfaces 22, 24 are embodied in a flush manner with another surface region 48 of the table 16 that is provided as a bearing surface for objects. The active surfaces 22, 24 of the solar cell unit 20 alternatively also protrude beyond the other surface region 48 or can be embodied in a recessed manner with respect to the other surface region 48. The active surfaces 22, 24 are coated with a protective coating so that in particular the active surface 22 can likewise be used as a bearing surface in a folded-down state of the table 16. The solar cell unit 20 comprises, in addition to the active surfaces 22, 24 that can comprise, for example, an anti-reflection coating, further elements not illustrated, such as a layer in which a power cable can be connected in order to draw off generated power.

Power line elements 36 that run inside the table 16 and are implemented by coaxial cables connect the active surfaces 22, 24 of the solar cell unit 20 to each other, to an intermediate energy storage unit 30, which is accommodated in a region of the back rest of the vehicle seat 12, and to the USB interface 28. The intermediate energy storage unit 30 is implemented by a rechargeable battery. The USB interface 28 is arranged in a side region of the table 16 and is accessible both in the folded-down and in the folded-up state of the table 16. A connecting unit 34 that comprises power line cables connects the power supply unit 18*a* of the vehicle interior device 10*a* to further power supply units 18*a* of further vehicle interior devices 10*a* in a row of seats, which power supply units can consequently cooperate with each other. The power supply units 18*a* can for example jointly supply power to an individual power supply interface 26 and consequently provide increased performance and/or jointly charge one or a plurality of intermediate energy storage units 30. As an alternative or in addition thereto, the power supply unit 18*a* can also be connected by way of the connecting unit 34 to an operating network of the vehicle and excess power can be supplied to said operating network.

Figure 2:
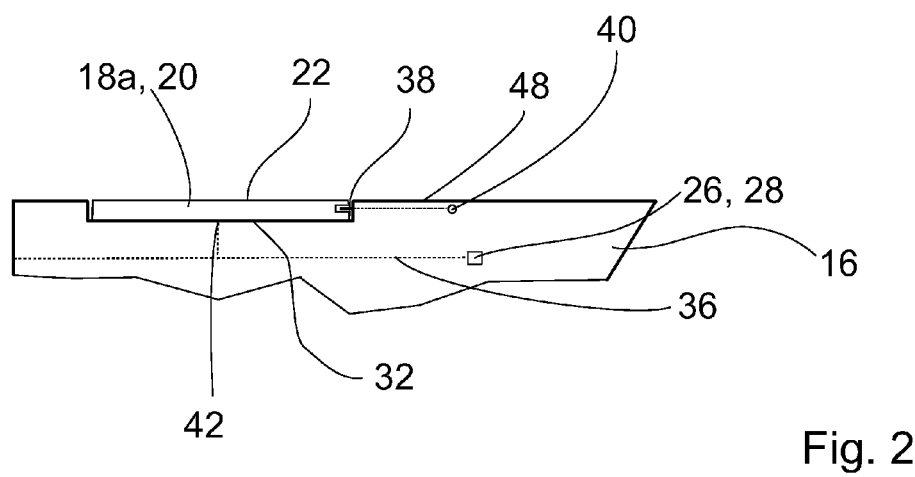
FIG. 2 is a schematic view of a table of the vehicle seat having a power supply bearing unit that releasably supports an energy harvesting unit.

FIG. 2 illustrates a power supply bearing unit 32 on which the power supply unit 18*a* is releasably mounted. For the sake of improved clarity, only an upper part of the table 16 is illustrated. The power supply bearing unit 32 comprises a cut-out in the table 16 into which a part unit of the solar cell unit 20 that comprises the active surface 22 is inlaid. When the power supply unit 18*a* is inlaid in the cut-out, the active surface 22 is flush with the other surface region 48 of the table 16. In order for the part unit to be fastened in a releasable manner, the power supply bearing unit 32 comprises a retaining element 38 that is embodied as a retractable holding bar that engages in a cut-out provided for this purpose in the part unit of the solar cell unit 20 below the active surface 22. The retaining element 38 is retracted by means of pressure being exerted on an actuating button 40, so that the part unit of the solar cell unit 20 can be removed from the cut-out in the table 16. Once the part unit has been removed, it can be used at other sites in order to generate power, for example it can be fastened to a window by means of fastening means, not illustrated.

The part unit is connected for this purpose by means of a connecting element 42, which is embodied as a removable power cable, at a lower face to the power line elements 36 in the table 16 and is connected by way of the power line elements 36 to the USB interface 28 and the intermediate energy storage unit 30.

Figure 3:
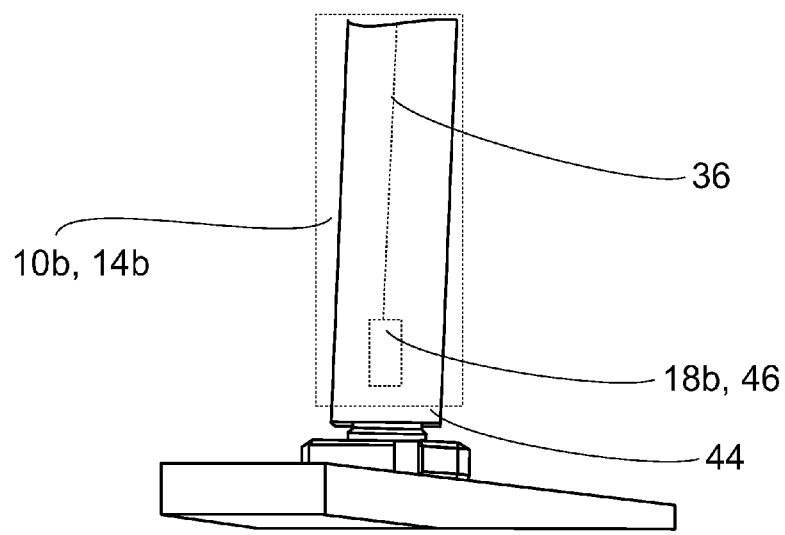
FIG. 3 is a schematic view of an alternative vehicle interior device having a piezo element that is integrated into a seat foot.

FIG. 3 illustrates as an alternative or additional embodiment a part of a vehicle interior device 10*b*. In this variant, the vehicle interior device 10*b* comprises a vehicle seat device 14*b* that is integrated in a seat foot 44. The seat foot 44 is used to harness vibrations during a vehicle movement, for which purpose the seat foot 44 comprises a resilient unit. A power supply unit 18*b* that is integrated in the vehicle seat device 14*b* is implemented by a piezo unit 46 comprising a plurality of piezo elements that convert the vibrations into power. The generated power is further transmitted by way of power line elements 36 to a power supply interface 26 and/or to an intermediate energy storage unit 30.

Figure 4:
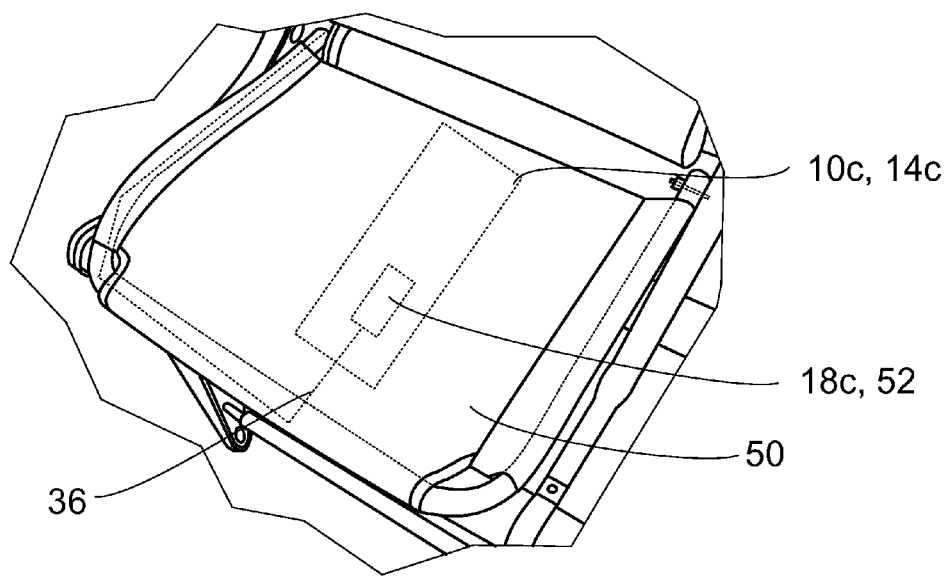
FIG. 4 is a schematic view of an alternative vehicle interior device having a thermo-element that is integrated in a seat base.

FIG. 4 illustrates a further alternative or additional embodiment of a vehicle interior device 10*c* having a power supply unit 18*c* that is implemented by a thermo-element 52 that is based on the Seebeck effect, which thermo-element converts the ambient heat into power. The power supply unit 18*c* is installed as part of a vehicle seat device 14*c* in a seat base 50.

The invention claimed is:

1. An aircraft interior device comprising;
   at least one power supply interface; and
   at least one power supply unit, wherein
   the power supply unit is implemented by a solar cell unit, at least a vehicle seat device that forms at least one part of a table into which the power supply unit is at least partially integrated, a power supply bearing unit on which the power supply unit is releasably mounted, the power supply bearing unit comprising a cut-out in the table into which a part unit of the solar cell unit which comprises an active surface is inlaid.

2. The aircraft interior device according to claim 1, wherein the power supply unit comprises at least one active surface having differing orientations and/or two active surfaces having differing orientations.

3. The aircraft interior device according to claim 1, further comprising:
   an intermediate energy storage unit.

4. The aircraft interior device according to claim 1, wherein the power supply interface is implemented by a USB interface.

5. The aircraft interior device according to claim 1, further comprising:
   a connecting unit that is provided in order to connect the power supply unit to at least one power supply unit at least of a further vehicle interior device.

6. The aircraft interior device according to claim 1, wherein the active surface of the solar cell unit is flush with the other surface region of the table when the power supply unit is inlaid in the cut-out.

7. The aircraft interior device according to claim 1, wherein the power supply bearing unit comprises a retaining element that is embodied as a retractable holding bar that engages in a cut-out provided for this purpose in the part unit of the solar cell unit below the active surface.

8. The aircraft interior device according to claim 7, wherein the power supply unit is installed as a part of a vehicle seat device in a seat base.

\* \* \* \* \*